United States Patent [19]

Oswalt, Jr.

[11] 4,399,730

[45] Aug. 23, 1983

[54] FLOATING ANGLE KNIFE FOR METAL WORKING MACHINES

[76] Inventor: Harry L. Oswalt, Jr., 615 Briar Hill, Garden City, Kans. 67846

[21] Appl. No.: 261,045

[22] Filed: May 7, 1981

[51] Int. Cl.³ .................. B23D 15/04; B23D 23/00
[52] U.S. Cl. .................................. 83/579; 83/608; 83/694; 83/699
[58] Field of Search .............. 83/608, 607, 556, 640, 83/694, 699, 698, 579

[56] References Cited

U.S. PATENT DOCUMENTS

| | | | |
|---|---|---|---|
| 402,381 | 4/1889 | Aiken | 83/694 |
| 1,663,092 | 3/1928 | Parys | 83/694 |
| 2,964,984 | 12/1960 | Schott | 83/694 |
| 3,195,387 | 7/1965 | Telfer | 83/694 X |
| 3,866,522 | 2/1975 | Oswalt, Jr. | 83/608 X |
| 4,367,669 | 1/1983 | Legorburu | 83/579 |

Primary Examiner—Frank T. Yost
Attorney, Agent, or Firm—Schmidt, Johnson, Hovey & Williams

[57] ABSTRACT

A knife assembly for shearing angle stock has a square, plate-like, floating cutter provided with a pair of opposed, flat, parallel faces, presenting four, stock-engaging corners each having two pairs of cutting edges, permitting eight "settings" used successively as wear, breakage or dulling may require. Four rigid stops and a pair of floating abutments are provided so that during use, regardless of which of two directions the knife tends to rotate when engaging the stock, it is firmly backed up within a cutter-receiving recess formed in a shiftable cutter support.

8 Claims, 5 Drawing Figures

FLOATING ANGLE KNIFE FOR METAL WORKING MACHINES

The present invention relates to improvements on the floating cutter blade assembly of my U.S. Pat. No. 3,866,522, titled "Metal Working Machine", issued Feb. 18, 1975 and incorporated herein by reference for a better understanding of the principles of the instant invention.

The floating blade disclosed in said patent has a semicircular portion rotatable about a fixed axis within a recess and a single, external corner for engaging angle stock to be sheared. The internal portion of the blade is traversed by a pivot bolt, and a single stop bolt parallel with the pivot passes across the recess loosely through an enlarged, transverse hole in the blade above the pivot, such that blade rotation is limited by the stop bolt in both directions of rotation of the blade on said axis relative to its swingable support beam.

A releasable, polygonal, preferably square cutter plate is provided in accordance with my present improvements such as to present four corners, each having two pairs of cutting edges, thereby appreciably increasing its useful life. The plate itself loosely surrounds a pivot bolt, and back up abutments, both rigid and floating, are disposed in the recess for engagement by peripheral portions of the plate.

Figure 1:
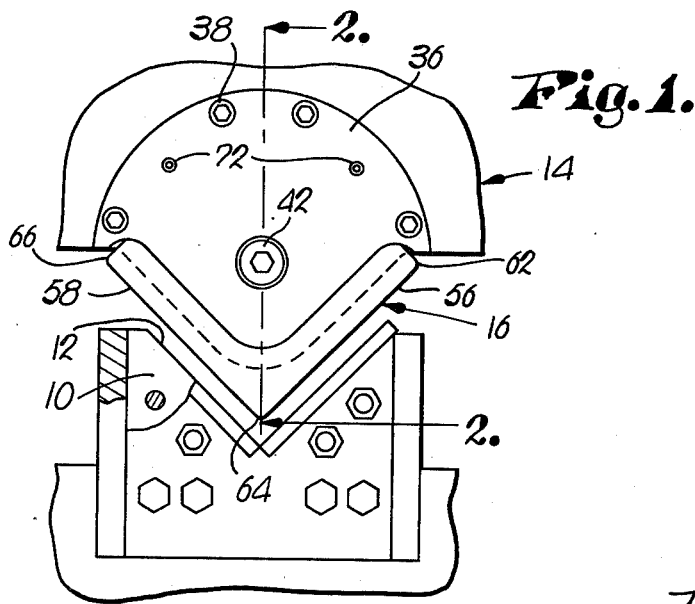
FIG. 1 is a fragmentary front elevational view of a floating angle knife for metal working machines made according to my present invention.
Figure 2:
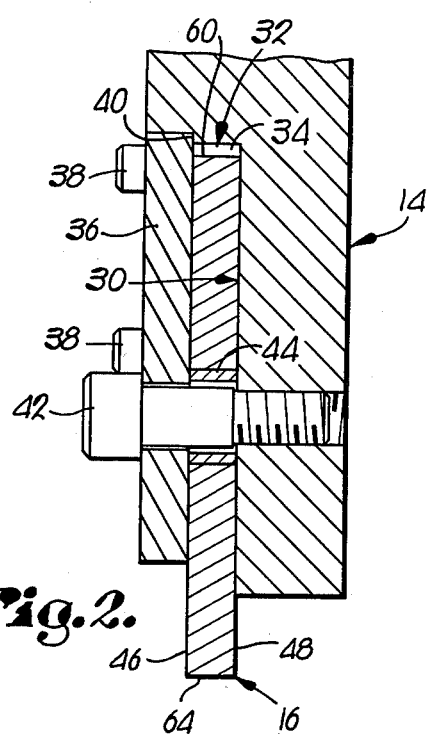
FIG. 2 is an enlarged, fragmentary cross-sectional view taken on Line 2—2 of FIG. 1.

A stationary cutter blade 10, not unlike that shown and described in U.S. Pat. No. 3,866,522, has a notch 12 (FIG. 1) for receiving angle stock (not shown) to be sheared. A support 14 is in the nature of an elongated beam, as in said patent, swingable about a horizontal axis, for movement of a square cutter plate 16 toward and away from the blade 10. The improvements herein upon the concepts of said patent relate to the plate 16, together with a pair of rotatable abutments 18 and 20, as well as to a number of rigid stops 22, 24, 26 and 28, and to parts and features in regard thereto.

The support 14 has a recess 30 into which the plate 16 extends, grooves 18' and 20' communicating with the recess 30 for receiving abutments 18 and 20 respectively, and an essentially V-shaped cavity 32, also communicating with the recess 30, presenting the abutments 22 and 26, and provided with a semi-circular portion 34 at its apex. A cover 36, overlapping the plate 16 and the abutments 18, 20, is removably attached to the support 14 by releasable fasteners 38 to clamp the cover 36 against a semi-circular shoulder 40 on the support 14.

A stud 42 through the cover 36 and through a tubular spacer 44, centered in the plate 16, is releasably connected to the support 14. The spacer 44, clamped by the stud 42 between the cover 36 and the support 14, has a length sufficient to permit movement of the plate 16 and the abutments 18, 20 relative to the support 14, and the shoulder 40 also precludes the fasteners 38 from holding the cover 36 too tightly against the plate 16 and the abutments 18, 20.

The plate 16 is characterized by having opposed, flat, parallel faces 46 and 48, the latter of which is shown flatly engaged with a planar bottom or inner surface 50 of the recess 30 formed on the support 14. Noteworthy also is the fact that the plate 16 has two pairs of elongated, straight, flat, peripheral edges 52, 54 and 56, 58, presenting four corners 60, 62, 64 and 66. Thus, each corner has two pairs of cutting edges, one pair adjacent each face 46 and 48 respectively.

The identical abutments 18 and 20 are each in the nature of a segment of a disc having the same thickness as the plate 16, such that their opposed flat surfaces are flush with the corresponding faces 46 and 48 of the plate 16. Hence, grooves 18', 20' have concave races 68 and 70 slidably engaged by the convex edges of the abutments 18, 20, and the straight, flat edges of the abutments 18 and 20 are shown as slidably engaged by the edges 52 and 54 respectively of the plate 16.

The cover 36 has pins 72 extending loosely through spacers 74 within the abutments 18 and 20, both spacers 74 being clamped tightly between the cover 36 and the support 14 by the fasteners 38.

OPERATION

Figure 3:
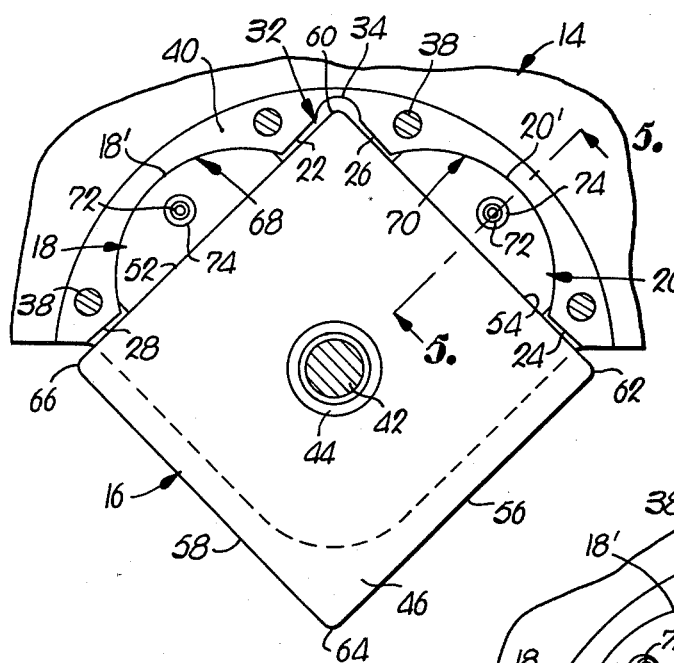
FIG. 3 is an enlarged view similar to FIG. 1 with the cover plate removed and the stationary blade omitted.

In the event the plate 16 strikes the workpiece in the notch 12 at the corner 64 firmly and evenly, with equal resistance to cutting along both legs of the workpiece angle, the plate 16 and the abutments 18, 20 will remain in the positions shown in FIG. 3. However, such conditions seldom exist; on the contrary, the plate 16 tends to rotate in one direction or the other about the axis of the stud 42 as the corner 64 strikes the workpiece and begins its cutting action followed by a fracture at the zone of separation.

Figure 4:
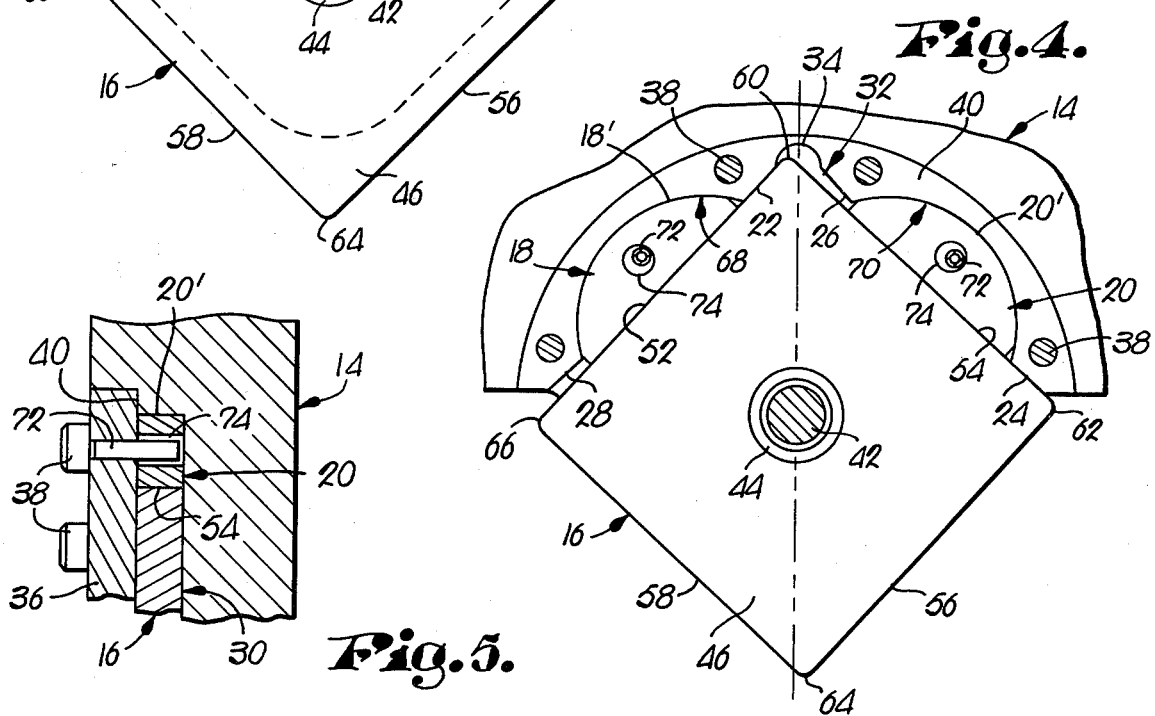
FIG. 4 is a view similar to FIG. 3 showing the floating blade engaging certain of the abutments.
Figure 5:
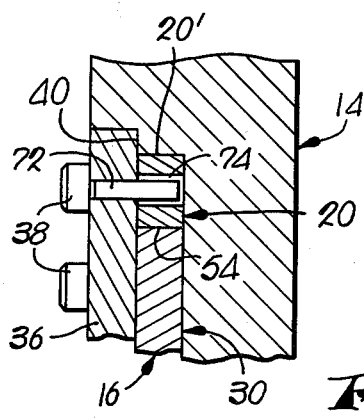
FIG. 5 is a fragmentary, detailed cross-sectional view taken on Line 5—5 of FIG. 3.

Assuming rotation of the plate 16 anti-clockwise (viewing FIG. 4), edges 52 and 54 will contact stops 22 and 24 respectively. At the same time, such movement of the plate 16 causes rotation of the abutments 18 and 22 within the grooves 18' and 20' along the races 68 and 70 to the positions shown in FIG. 4.

Conversely, if plate 16 rotates clock-wise (not shown) the edges 52 and 54 cause clock-wise rotation of the abutments 18 and 20 until the stops 26 and 28 are engaged by the edges 52 and 54 respectively, all the while without loss of contact between the plate 16 and the abutments 18, 20.

After the sharp cutting edges at the corner 64 become unduly dull, the remaining corners 60, 62 and 66 may be placed in use simply by removing the stud 42 and repositioning the plate 16 in the recess 30. Thereupon, the plate 16 may be inverted, placing its face 46 against the surface 50, presenting four more uses of the corners 60–66. The pins 72 serve the sole purpose of precluding the abutments 18 and 20 from dropping out of their grooves 18' and 20' during removal and replacement of the plate 16.

I claim:

1. In a shearing machine,
    a stationary cutter blade having a notch for receiving angle stock to be sheared;
    a shiftable support having a recess;
    a quadrilateral cutter plate having a pair of opposed, flat faces and two pairs of peripheral edges, presenting four corners,
    said plate extending into the recess, disposing a first pair of said edges within the recess, a second pair of said edges merging toward one of said corners, said one corner being disposed exteriorly of the recess, said plate being carried by the support for movement of said one corner into and out of engagement with the stock in said notch during shifting of the support;

a pair of abutments in said recess each engaging a respective one of said first pair of edges for resisting the load to which the plate is subjected when said one corner is moved against the stock, said plate and said abutments being rotatable relative to the support in response to movement of said one corner against the stock; and rigid stop means disposed in said recess for engagement by said first pair of edges for limiting the extent of rotation of the plate relative to the support.

2. The invention of claim 1, there being a pair of spaced stops disposed for engagement by each of said first pair of edges respectively.

3. The invention of claim 1, said plate being square and having its axis of rotation equidistant from said corners.

4. The invention of claim 1, said support having a race for each abutment respectively along which the abutments slide during rotation thereof relative to the support in response to rotation of the plate.

5. The invention of claim 4, each race having a concave configuration, each abutment having a convex edge complementally engaging its race.

6. The invention of claim 5, said abutments having straight, flat edges engaging said first pair of peripheral edges and disposed in opposed relation to the said convex surfaces thereof.

7. The invention of claim 6, each abutment being a segment of a disc, presenting a pair of opposed, flat surfaces flush with said faces.

8. The invention of claim 7, said support having a groove receiving each disc respectively.

* * * * *